Patented Apr. 16, 1940

2,196,971

UNITED STATES PATENT OFFICE 2,196,971

BONDING COMPOUND

Willis A. Boughton, Cambridge, and William R. Mansfield, Boston, Mass., assignors, by mesne assignments, to New England Mica Company, Waltham, Mass., a corporation of Massachusetts No Drawing. Application August 8, 1938, Serial No. 223,718

26 Claims. (Cl. 134—23.1)

This invention relates to improvements in bonding compounds that will retain their bonding qualities at high temperatures. Such compounds are particularly useful in effecting the integration of discrete particles of matter which are non-reacting therewith and non-soluble therein, into practically unitary bodies.

In the following description of the invention disclosed herein both as a composition and as a bonding agent reference is made specifically to its special advantages as related to the manufacture of laminated mica insulating products, but it must be understood that the application of the properties, principles and methods disclosed herein may be made to other uses and materials such, for example, as the preparation of glass-like compositions of matter consisting of the reaction products obtained after fusion of the mixed components of the compositions, and in the impregnation and bonding into unitary products of inorganic fibrous materials such as asbestos, spun glass, slag wool, with or without other heat-resisting matter. Other applications of the invention will be obvious to those skilled in arts where the invention may be applied.

One object of the invention is to produce inorganic bonding compounds which shall exhibit a thermal behavior such that they will flow at red heat and, on cooling, form clear, hard, glass-like substances characterized by a high degree of adhesion to adjacent surfaces and resilient when in the form of a film between such surfaces; shall be essentially unaltered upon repeated subjection thereafter to temperatures of redness; shall possess high electrical insulation resistance values and dielectric strengths; and shall be non-charring, non-combustible, and fireproofing.

A further object is to produce bonding compounds having properties which make them especially beneficial in the manufacture of laminated mica plate for use, primarily, as insulation in electric heater appliances, but also in various other types of electric devices.

A further object of the invention relates to the production of the pure composite glass-like substances made from a fusion of the components of unfused compositions of matter as herein disclosed, and capable of functioning as high temperature adhesives.

Further objects of the invention will be apparent to those skilled in the related arts after reading this specification.

Composite high temperature-resistant mica plate has attained a position of distinct and increasing importance in the field of electrical insulation by virtue of its availability in large sheets having uniformity of quality and dimensions and adaptability to processing. In spite of the fairly old art of manufacturing composite mica plate only a very limited number of binders have been found to be capable of use, and none heretofore available have been found to exhibit all of the requisite properties or desirable features found in the binder of this invention. Thus, sodium silicate exhibited a marked tendency to intumesce at high temperatures. Boron trioxide showed a failure to fuse thoroughly to a clear glass-like adhesive form. The most successful commercially of the high temperature binders has been based on the use of sodium metaphosphate (see Dawes and Boughton, U. S. Patent 1,578,812) but this product which exhibits excellent hardness, adhesion, and clarity, shows an electrical insulation resistance inadequate to meet the exacting current leakage maximum requirements of many present-day electric heater appliances. These limitations or shortcomings, together with recent trends in the variety and operating requirements of electric heater appliances impelled the development of the improved binders and products described herein.

The trend in electric heater appliances to higher temperatures of operation, greater heat-up speeds and thermostatic operation, together with the requirement of specific maximum current leakages to eliminate shock hazard, has placed an increasingly greater burden on the insulation. In order to satisfy the assembly and operating conditions of the element units of electric heater appliances, the insulation must possess a high degree of mechanical integration to permit free punching, notching, and element winding; must be capable of repeated subjection to the operating temperatures of the appliance essentially without physical or chemical changes; and must exhibit an electrical insulation resistance sufficiently high to eliminate the possibility of shock hazard at the operating conditions of the appliance.

It is obviously highly desirable in the manufacture of high temperature-resistant bonded mica plate and other bonded mica products to subject the bonding material, or the mixed components which after fusion and reaction constitute the bonding agent, to a fusion temperature as near as practicable to the disintegration temperature of the mica films themselves, in order to obtain maximum fluxing reaction of the bonding material and resulting thermal resistance of the binder, and to obtain in the mica plate those qualities most essential in subsequent conditions of assembly, use and operation. Thus, when India mica (Muscovite) films are used, the temperature of manufacture should be in the general range of about 580° C. to about 650° C. (1076° F.–1202° F.) and with amber mica (Phlogopite) manufacturing temperatures up to about 875° C. (1607° F.) may be used.

Another essential property of any inorganic bonding composition in use as a binder for high temperature-resistant mica plate is that it must show a low thermal coefficient of expansion, not greatly different from that of mica itself, at all temperatures up to and including temperatures of redness. Otherwise, cracking, buckling or disruption of the mica plate results when it is heated to or cooled under pressure from temperatures of redness, during manufacture. Therefore, when we mention a good mica plate or mica binder we mean, among others, that this criterion also has been observed.

Therefore, in a search for inorganic compositions of matter suitable for use as binders for mica films in the manufacture of high temperature-resistant bonded mica plates, we have investigated the properties of many compounds, including boron trioxide, in various combinations. Prior attempts to use boron trioxide either alone or in combination with lead salts have not been practical commercially. Such products have been found to have various deleterious or disadvantageous properties which have prevented them from attaining any considerable commercial use. Mica plates made with such bonding materials have been offered to the electrical appliance manufacturers from time to time but their faults have been so obvious that they are of extremely limited, if any, use today.

In U. S. Patent 1,578,812, Dawes and Boughton had stated that boron trioxide alone was unsuited to the conditions required because of its high fluidity at red heat. On the other hand, in U. S. Patent 1,386,008, McCulloch stated that boron trioxide softens at moderately elevated temperatures of the order of 500° C. (932° F.) but does not become fluid except at temperatures several hundred degrees above this point. Although various melting points are given in the literature, generally 577° C. (1071° F.) we have found that boron trioxide has no sharply defined melting point, but rather softens and then increases in fluidity as the temperature is increased. Our experiments have shown that even when subjected to temperatures well above its stated melting point, 577° C. (1071° F.), boron trioxide exhibits a failure to fuse thoroughly to give a clear glass-like adhesive form on cooling, especially under the conditions of manufacture of high temperature-resistant bonded mica plate. This residual opacity involves inadequate adhesion and clarity of the binder and inadequate hardness and mechanical integration of the bonded product, causing such products to be unsuited to meet the requirements of heater appliance insulation described above. We have been able to overcome these disadvantageous properties by mixing with boron trioxide certain other inorganic compounds in limited variety; and thus, upon application of heat as usual we have obtained highly improved products. The resulting glass-like substances formed at high temperatures differ from the true glasses in the following particulars:

(a) They are adhesive to mica when in a fused state, whereas all low-melting commercial glasses that we have been able to obtain show marked lack of the necessary adhesion.

(b) The thermal coefficients of expansion of the fused compositions are close to that of mica, while those of the low-melting glasses are so different from that of mica that when fused in contact therewith and cooled the glass cracks, and the plate is correspondingly imperfect.

(c) The bonding efficiency of the major constituent in the bonding composition is enhanced by the presence of the other components, whereas ordinary glasses appear to have no major component that is, alone, essentially a mica adhesive, and no combination of components has been found in which any one factor has a noticeable effect of enhancing the adhesion of glass to mica, with the possible exception of fluorine compounds occasionally employed, which, however, in the common glasses tried fail to have sufficient effect to permit the use of glass as an efficient mica binder.

(d) The flowing point of the melted binder is distinctly lower and is in the range of the decomposition temperature of mica itself, while the so-called low-melting glasses of commerce tried thus far still melt only at temperatures higher than the decomposition temperature of India mica itself.

In the construction of the mica plate, we may apply the binder composition which may consist of the unfused mixed components or which may be a pre-fused reaction product, between the mica films as a dry powder, as a paste, in aqueous solution, or dispersed or dissolved in an aqueous or organic solvent or mixture of solvents. Thereafter the mica plate so constructed is heated, and the fusion reaction effected in situ producing the reaction product bonding agent during the manufacture of the bonded plate.

In manufacturing the high temperature mica plate the assembly constructed as above is, as a preliminary step, first treated for removal of the solvent or dispersing medium by heating to a suitable temperature, ordinarily 60° C.–70° C. (140° F.–158° F.), under reduced pressure in a vacuum oven. This removal of the solvent or suspending medium, partial if aqueous and complete if organic, is preparatory to the final fusion reaction of the bonding composition used. The degree of vacuum and the heat treatment must be so related as to liberate the vapors in such a gentle way that the structure of the mica plate, i. e. the overlapping relation and flat position of its films remains unchanged at the end of this treatment. Some water may remain without being deleterious to the final fusion reaction but when an organic dispersing medium is used the solvent should be entirely removed at this stage in order to prevent the later formation of a charred residue, such as yielded by glycerine and its compounds, in the fused mica plate.

After this treatment the mica plate is subjected to temperatures of redness and to suitable compression to effect the chemical and physical changes necessary to produce the mechanical integration, thermal stability and other properties required of high-temperature-resistant mica plate.

The improved binders of this invention are based on the modification and improvement of the properties as a mica binder shown by boron trioxide alone obtained by the incorporation into the original bonding mixture or solution or dispersion, of a fluorine-containing component which we have discovered has an extraordinary fluxing effect on the boron trioxide. Furthermore, this has permitted us to bring out still further improvement by making possible the introduction of other desirable components into the bonding composition, especially silicious and lead components. These new, modified binders prepared as described below show a common characteristic of essential improvement over any previously available in that they fuse completely at temperatures of redness to yield bonded mica plates of superior hardness, adhesion and clarity, and of notably high electrical insulation value.

We may substitute one or more thermally-decomposable boron trioxide-forming compounds, such as boric acid, in part or entirely for boron trioxide; such compounds when heated to the manufacturing temperature of the mica plate decompose chemically and leave a residue composed of boron trioxide. In the claims herewith we have, for simplicity, consistently named boron trioxide as typical of the component of the composition which supplies this substance with the intent, however, that such claims shall include within their scope not only boron trioxide itself but also all useful equivalents thereof, for example any thermally-decomposable boron trioxide-forming compound as well as any desired combination of such materials.

Thus, the improved binders embraced in this invention may be classified into two groups, as follows:

*Group 1.*—Binders containing boron trioxide with effective proportions of non-elemental fluorine, that is, fluorine in combination, or combined fluorine.

*Group 2.*—Binders containing boron trioxide and effective proportions of combined fluorine, together with a silicious material, or a lead compound, or both a silicious material and a lead compound, these modifications also yielding compositions which are essentially fluxable under the conditions of manufacture to give clear glass-like mica adhesives. For a lead compound, we may substitute the oxide of some other heavy metal such as tin, arsenic, antimony, or bismuth.

In determining the effective proportions of binder components, the thermal behavior, the mechanical properties, and the electrical insulation resistance values, have all been taken into consideration. These criteria have been observed also in the selection of the optimum proportions. Thus, although the tabulated results relate specifically to the effect of the various modifiers of boron trioxide upon the electrical insulation resistances of mica plates bonded with these compositions, we have taken into consideration also their effect in producing improvement in the essential thermal and mechanical properties of the bonding compositions and other heat-resisting substances bonded with them as described above in the objects and subject matter of this application.

The several tables in this application show the percentage compositions of various modified boron oxide formulas and the minimum electrical resistances at 650° C. (1202° F.) of high temperature-resistant mica plates bonded with the fused reaction products of these compositions. The binder formulas are given for the bonding composition mixtures used for application to the mica films in constructing the composite plate, and before fusion. The resistance values represent measurements made on the high temperature-resistant mica plates, bonded with these reaction products that have been produced in situ by heating the composite mica plates containing the unfused composition to temperatures of redness and subjecting them to adequate applied pressures, and cooling under pressure.

The electrical insulation resistance values given in the tabulations represent measurements made on 10 square inches of the test mica plates, 0.015" in thickness, in a test clamp designed for the purpose. The resistances, which are expressed in megohms at 500 volts D. C. are absolute only for the specific conditions of test and serve, therefore, only as a basis for comparison. The measurements were made during heating to 650° C. (1202° F.) and while the mica plate was kept at 650° C. for 15 minutes, the tabulated values being the minimum resistances measured at any time during the test.

In considering these results, it should be noted that even a relatively small improvement in electrical resistance is of value, in that it means a substantial decrease in the current leakage of an electrical heater appliance in which the mica plate serves as insulation, thereby reducing shock hazard.

Group 1

As stated above, we have found that boron trioxide when used alone as a mica binder failed to fuse thoroughly, under the conditions of manufacture of high temperature-resistant mica plate, to a clear glass-like adhesive form and that because of the residual opacity, mica plate bonded with it exhibited inadequate hardness and mechanical integration. As the result of our investigation, however, we have obtained markedly beneficial results by the addition of effective proportions of hydrofluoric acid, hydrofluosilicic acid, or one or more of their alkali metal or ammonium salts to boron trioxide, and effecting a probable chemical reaction by fusion. By "effective proportions" is meant proportions such that the resulting binders shall by virtue of the effect of the added fluorine compound exhibit adequate fluidity and complete fusion to a clear mica-adhesive glass-like form, and by virtue of this clarifying or fluxing effect, the fused bonded mica plates shall possess excellent hardness, adhesion, clarity, and mechanical integration. Depending upon the specific fluorine compound used in the unfused binder composition, these effective proportions range from about 1% to about 20%.

Another beneficial effect of the addition of fluorine compounds to boron trioxide is in the improvement in electrical insulation resistance values over that shown by boron trioxide alone. Mica plates bonded with compositions containing boron trioxide with various types and percentages of fluorine compounds show improved electrical insulation resistance in every case over plates bonded with boron trioxide alone (see Table I).

In our tests we used as the sources of the fluorine components one or more of the following: a 52–55% aqueous solution of hydrofluoric acid; a 30.5% hydrofluosilicic acid solution, and various technical grades of alkali metal and ammonium fluorides and fluosilicates (silicofluorides).

TABLE I

*Electrical insulation resistances of fused bonded mica plates at 650° C. (1202° F.)*

(FORMULAS GIVEN FOR BINDER COMPOSITIONS BEFORE FUSION)

| Boron trioxide Percent | Fluorine compound Percent | Elec. ins. res. in megohms |
|---|---|---|
| 100.00 | ---------- | 0.46 |
| 98.5 | 1.5 HF | 1.37 |
| 80.0 | 20.0 NH$_4$F.HF | 0.61 |
| 96.75 | 3.25 NaF. HF | 0.57 |
| 80.0 | 20.0 KF. HF | 1.32 |
| 96.0 | 4.0 H$_2$SiF$_6$ | 1.11 |
| 93.33 | 6.67 (NH$_4$)$_2$SiF$_6$ | 0.63 |
| 96.75 | 3.25 Na$_2$SiF$_6$ | 0.54 |

Group 2

The second group of improved binders contains boron trioxide and the necessary effective proportions of combined fluorine as described above, together with a silicious material, or a lead compound, or both a silicious material and a lead compound, yielding compositions which are essentially fluxable, under the conditions of manufacture, to form clear glass-like mica-adhesive compositions. For the lead compound we may substitute the oxide of some other heavy metal such as tin, arsenic, antimony, or bismuth.

In contrast to the results tabulated in Tables II and III below, our experiments have shown that, in the absence of fluorine compounds, boron trioxide combinations with silicious materials or lead compounds are incapable of complete fusion to clear permanent glass-like forms under mica plate manufacturing conditions. Similarly, it has not been possible to effect vitrification of mixtures of silicious materials and lead oxide alone at the temperature of manufacture of high temperature-resistant bonded mica plate. In these cases the lack of fusion and residual opacity produced inadequate hardness, adhesion, clarity, and mechanical integration in the mica plates bonded with these compositions.

We have been able, however, by the addition of effective proportions of combined fluorine to boron trioxide to flux the silicious materials and lead compounds in these compositions so that mica plates bonded under pressure with the reaction product obtained by fusion in situ exhibit excellent hardness, adhesion, clarity, and mechanical integration, as well as increased electrical insulation resistance and moisture-resistance. Thus, the fluxing effect of the added fluorine compound is specific and marked.

The three methods described below relate to improved compositions of this group.

*First method*

It has been discovered that from about 1% to about 33% of finely divided silica or mineral silicates or soluble silicates may be incorporated with boron trioxide to effect the formation of clear, adhesive, glass-like binders at red heat by the addition of about 1% to about 20% of hydrofluoric acid, hydrofluosilicic acid, or one or more of their alkali metal or ammonium salts. The resulting binders flow under pressure to give clear glass-like adhesives at red heat, so that on cooling the mica plates bonded therewith are hard, clear, and excellently fused and possess a high degree of mechanical integration and improved high electrical insulation values.

It is our belief that in this type of binder the silicious component is colloidally dispersed in the composition, but whether or not this theory is correct the fact remains that the silicious component functions to maintain and stabilize the fluxing temperature of the mixture at a correct temperature and to enhance materially the electrical insulation resistance of the binder. The silicious component should have a degree of fineness of at least 300 mesh and should not exceed 33% of the total weight of the unfused binder components. Greater proportions impart a faint to dense capacity to the bonded mica plate, with consequent inadequacy of the desired mechanical integration. As the silicious component we may elect to use powdered or precipitated silica, preferably silicic acid, or a powdered mineral silicate such as feldspar, or aqueous solutions (colloidal dispersions) of soluble silicates such as sodium or potassium silicate or metasilicate. During mixing of the bonding composition the soluble silicates "gel" in aqueous solutions of boron trioxide, but can be sufficiently dispersed to permit uniform distribution on application.

In Table II, the silicious material in combination with added fluorine compound is shown in every instance to produce increased electrical insulation resistance of mica plates bonded with the fused compositions over that of plates bonded with boron trioxide alone.

TABLE II

*Electrical insulation resistances of fused bonded mica plates at 650° C. (1202° F.)*

(FORMULAS GIVEN FOR BINDER COMPOSITIONS BEFORE FUSION)

| Boron trioxide Percent | Silicious material Percent | Fluorine compound Percent | Elec. ins. res. in megohms |
|---|---|---|---|
| 100.0 | | | 0.46 |
| 90.0 | 5.0 silicic acid | 5.0 $NH_4F.HF$ | 0.50 |
| 81.1 | 16.2 silicic acid | 2.7 KF | 1.40 |
| 81.5 | 16.25 silicic acid | 2.25 HF | 1.60 |
| 75.0 | 5.0 silicic acid | 20.0 $NH_4F.HF$ | 0.62 |
| 60.0 | 33.0 silicic acid | 7.0 $NH_4F.HF$ | 1.12 |
| 81.1 | 16.2 infusorial earth | 2.7 $NH_4F.HF$ | 1.11 |

*Second method*

We have found that from about 1% to about 20% of a lead compound may be incorporated with boron trioxide to effect the formation of clear, adhesive, glass-like binders at red heat by the addition of about 1% to about 20% of hydrofluoric acid, hydrofluosilicic acid, or one or more of their alkali metal or ammonium salts, so that mica plates bonded with these compositions at fusion temperature exhibit, on cooling, excellent hardness, adhesion, and clarity, a high degree of mechanical integration, high electrical insulation resistance values, and greater resistance to the action of water vapor.

The specific beneficial effect of the lead compound is believed to be to produce greater hardness and increased resistance of the compositions and products bonded therewith to physical and chemical change upon exposure to moisture. As the lead compound, we prefer to use red lead oxide, but we have found that yellow lead oxide and other lead compounds, such as the nitrate and carbonate, may be used. In place of the individual lead and fluorine compounds, we may use lead fluoride or lead silicofluoride. We have found also that the oxides of other heavy metals, such as arsenic, bismuth, tin, and antimony, may be used in place of the lead compound, but in relatively smaller proportions.

Table III shows the improved electrical insulation resistances at 650° C. (1202° F.) of fused mica plates bonded with compositions of these types, over that of plates bonded with boron trioxide alone.

TABLE III

*Electrical insulation resistances of fused bonded mica plates at 650° C. (1202° F.)*

FORMULAS GIVEN FOR BINDER COMPOSITIONS BEFORE FUSION

| Boron trioxide, percent | Metal oxide, percent | Fluorine compound, percent | Elec. ins. res. in megohms |
|---|---|---|---|
| 100.00 | | | 0.46 |
| 93.46 | 1.87 red PbO | 4.67 $NH_4F.HF$ | 0.637 |
| 90.9 | 4.55 red PbO | 4.55 $NH_4F.HF$ | 0.600 |
| 80.0 | 16.0 red PbO | 4.0 $NH_4F.HF$ | 0.635 |
| 96.75 | 3.25 $PbF_2$ | | 0.96 |
| 96.75 | 3.25 $PbSiF_6$ | | 0.65 |
| 90.9 | 4.55 $Sb_2O_3$ | 4.55 $NH_4F.HF$ | 0.900 |
| 87.0 | 8.7 $Bi_2O_3$ | 4.3 $NH_4F.HF$ | 0.860 |

Third method

We have discovered that mixtures comprising from about 50% to about 97% of boron trioxide, from about 1% to about 20% of a fluorine compound, from about 1% to about 40% of a silicious material, and from about 1% to about 20% of a lead compound yield compositions which produce still further improvement. In this type also the silicious material and lead compound are essentially fluxable, under the conditions of manufacture, the composition yielding glass-like mica-adhesives, and mica plates bonded therewith exhibit increased hardness, adhesion, clarity, and mechanical integration, improved electrical insulation resistance, and greater resistance to physical and chemical change upon exposure to moisture.

It is our belief that in this type of binder the silicious material and the lead compound are reacted chemically in the composition at the fusion temperature of mica plate manufacture to produce, at least to some extent, a true lead glass, as compared with the binder described under the first method, in which the silicious component is believed to be colloidally dispersed. For this reason, such a high degree of fineness as 300 mesh is not required of the silicious material in this type, and higher proportions may be used. Reference has been made earlier in this specification to the silicious materials, lead compounds and fluorine compounds that may be used in these compositions.

This method incorporates not only the specific effects of improvement of the invention boron trioxide modifiers as they have been described above, but also produces in the composition a collective effect of still greater improvement in increased hardness and moisture-resistance.

Table IV shows the improvement in electrical insulation resistance of fused mica plates bonded with various compositions of this type over that of plates bonded with boron trioxide alone.

TABLE IV

Electrical insulation resistances of fused bonded mica plates at 650° C. (1202° F.)

FORMULAS GIVEN FOR BINDER COMPOSITIONS BEFORE FUSION

| Boron trioxide, percent | silicic acid, percent | Lead oxide, percent | Ammonium acid fluoride, percent | Elec. ins. res. in megohms |
|---|---|---|---|---|
| 100 | | | | 0.46 |
| 90 | 6 | 2.5 | 1.5 | 0.61 |
| 75 | 15 | 6.25 | 3.75 | 0.72 |
| 60 | 20 | 12.0 | 8.0 | 0.92 |
| 60 | 32 | 6.0 | 2.0 | 1.06 |

The percentages given in the several tables are not to be taken as specific limitations, but rather to demonstrate the range of optimum proportions. Higher and lower proportions in the ranges given for the various components have also yielded effective improvement. A sufficient quantity, or mass, of mixed components as given in any of the numerous examples, may be regarded as a "batch," which batch will be fused as described herein.

Although the invention has been described with particular emphasis upon the use of these compositions as binders for mica films, it is readily apparent that their usefulness may be extended to various types of insulation materials, and to their service as fused glass-like materials.

The preceding description relates to the preferred embodiments of the invention. Minor changes in details or combinations with suitable other binders are intended to be included in the spirit and scope of the invention.

We claim:

1. A mixture of components constituting a batch, to be converted by fusion at temperatures of redness into a bonding compound for discrete particles of matter, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids.

2. A mixture of components constituting a batch, for a bonding compound in accordance with claim 1, in which the fluorine-containing compound is selected from the group consisting of hydrofluoric acid, the alkali metal salts of hydrofluoric acid and the ammonium salts of hydrofluoric acid.

3. A mixture of components constituting a batch, for a bonding compound in accordance with claim 1, in which the fluorine-containing compound is selected from the group consisting of hydrofluosilicic acid, the alkali salts of hydrofluosilicic acid and the ammonium salts of hydrofluosilicic acid.

4. A mixture of components constituting a batch, for a bonding compound in accordance with claim 1, in which the fluorine-containing compound is ammonium acid fluoride.

5. A mixture of components constituting a batch, to be converted by fusion at temperatures of redness into a bonding compound for discrete particles of matter, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a silicious material.

6. A mixture of components constituting a batch, for a bonding compound in accordance with claim 5, in which the silicious material is selected from the group consisting of silica, silicic acid, mineral silicates and water-soluble silicates and metasilicates.

7. A mixture of components constituting a batch, for a bonding compound in accordance with claim 5, in which the silicious material is silicic acid.

8. A mixture of components constituting a batch, to be converted by fusion at temperatures of redness into a bonding compound for discrete particles of matter, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a heavy metal oxide.

9. A mixture of components constituting a batch, for a bonding compound in accordance with claim 8, in which the heavy metal oxide is selected from the group consisting of the oxides of lead, tin, arsenic, antimony and bismuth.

10. A mixture of components constituting a batch, for a bonding compound in accordance with claim 8, in which the heavy metal oxide is red lead oxide.

11. A mixture of components constituting a batch, to be converted by fusion at temperatures of redness into a bonding compound for discrete particles of matter, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a silicious material, and a heavy metal oxide.

12. A mixture of components constituting a batch, for a bonding compound in accordance with claim 11, in which the fluorine-containing compound is ammonium acid fluoride, the silicious material is silicic acid, and the heavy metal oxide is red lead oxide.

13. A mixture of components constituting a batch, to be converted by fusion at temperatures of redness into a compound for bonding mica films, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids.

14. A mixture of components constituting a batch, for bonding compound in accordance with claim 13, in which the original unfused composition contained from about 80% upwards to about 99% boron trioxide, and from about 1% upwards to about 20% of a fluorine-containing compound.

15. A mixture of components constituting a batch, for a bonding compound in accordance with claim 13, in which the fluorine-containing compound is ammonium acid fluoride.

16. A mixture of components constituting a batch, to be converted by fusion at temperatures of redness into a compound for bonding mica films, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a silicious material.

17. A mixture of components constituting a batch for a bonding compound in accordance with claim 16, in which the original unfused composition contained from about 50% upwards to about 98% of boron trioxide, from about 1% upwards to about 20% of a fluorine-containing compound and from about 1% upwards to about 33% of a silicious material.

18. A mixture of components constituting a batch for a bonding compound in accordance with claim 16, in which the fluorine-containing compound is ammonium acid fluoride, and the silicious material is silicic acid.

19. A mixture of components constituting a batch, to be converted by fusion at temperatures of redness into a compound for bonding mica films, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a heavy metal oxide.

20. A mixture of components constituting a batch for a bonding compound in accordance with claim 19, in which the original unfused composition contained from about 60% upwards to about 98% of boron trioxide, from about 1% upwards to about 20% of a fluorine-containing compound, and from about 1% upwards to about 20% of a heavy metal oxide.

21. A mixture of components constituting a batch for a bonding compound in accordance with claim 19, in which the fluorine-containing compound is ammonium acid fluoride, and the heavy metal oxide is red lead oxide.

22. A mixture of components constituting a batch, to be converted by fusion at temperatures of redness into a compound for bonding mica films, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, and also a silicious material, and a heavy metal oxide.

23. A mixture of components constituting a batch for a bonding compound in accordance with claim 22, in which the original unfused composition contained from about 50% upwards to about 97% of boron trioxide, from about 1% upwards to about 20% of a fluorine-containing compound, from about 1% upwards to about 40% of a silicious material, and from about 1% upwards to about 20% of a heavy metal oxide.

24. A mixture of components constituting a batch for a bonding compound in accordance with claim 22, in which the fluorine-containing compound is ammonium acid fluoride, the silicious material is silicic acid, and the heavy metal oxide is red lead oxide.

25. A mixture of components constituting a batch, to be converted by fusion at temperatures of redness into a substance which upon cooling is a fused, glass-like solid product, said mixture having as its major component boron trioxide, and also having incorporated therein a minor proportion of at least one of the fluorine-containing compounds selected from the group consisting of hydrofluoric acid, hydrofluosilicic acid, and the alkali metal, and ammonium, and heavy metal salts of said acids, said product being thermoplastic at red heat due to fluxing, and at red heat and thereafter on cooling functioning as an adhesive for non-reacting discrete particles of matter.

26. A mixture of components constituting a batch, to be converted by fusion at temperatures of redness into a substance which upon cooling is a fused, glass-like solid product, said mixture containing from about 80% upwards to about 99% of boron trioxide, and from about 1% to about 20% of at least one of the fluorine-containing compounds selected from the group consisting of hydrofluoric acid, hydrofluosilicic acid, and the alkali metal, and ammonium, and heavy metal salts of said acids, said product being thermoplastic at red heat due to fluxing, and at red heat and thereafter on cooling functioning as an adhesive for non-reacting discrete particles of matter.

WILLIS A. BOUGHTON.
WILLIAM R. MANSFIELD.